US006229808B1

(12) United States Patent
Teich et al.

(10) Patent No.: US 6,229,808 B1
(45) Date of Patent: May 8, 2001

(54) METHOD OF COMMUNICATION FOR A COMPUTER USING PACKET SWITCHES FOR INTERNAL DATA TRANSFER

(75) Inventors: Paul R. Teich; Brett B. Stewart, both of Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 08/915,695

(22) Filed: Aug. 21, 1997

Related U.S. Application Data (60) Provisional application No. 60/039,423, filed on Mar. 7, 1997.

(51) Int. Cl.[7] .................................................. H04L 12/56
(52) U.S. Cl. .......................... 370/398; 370/473; 370/474
(58) Field of Search ..................................... 370/395, 398, 370/399, 401, 422, 905, 902, 473, 474, 392

(56) References Cited

U.S. PATENT DOCUMENTS

| | | | |
|---|---|---|---|
| 5,134,610 | * | 7/1992 | Shand et al. ........................ 370/400 |
| 5,159,591 | * | 10/1992 | Guhara et al. ...................... 370/366 |
| 5,274,782 | * | 12/1993 | Chalasani et al. .................. 710/131 |
| 5,563,884 | * | 10/1996 | Fimoff et al. ....................... 370/391 |
| 5,608,447 | * | 3/1997 | Farry et al. ............................. 348/7 |
| 5,629,932 | * | 5/1997 | Kim ....................................... 370/38 |
| 5,689,500 | * | 11/1997 | Chiussi ................................ 370/388 |
| 5,724,358 | * | 3/1998 | Headrick et al. ................... 370/418 |
| 5,737,334 | * | 4/1998 | Prince et al. ........................ 370/395 |
| 5,790,546 | * | 8/1998 | Dobbins et al. .................... 370/400 |
| 5,870,474 | * | 2/1999 | Wasilewski et al. ............... 713/161 |
| 5,959,992 | * | 9/1999 | Benayoun et al. .................. 370/395 |
| 5,959,994 | * | 9/1999 | Boggs et al. ........................ 370/399 |
| 6,031,838 | * | 2/2000 | Okabe et al. ....................... 370/395 |
| 6,035,366 | * | 3/2000 | Teich .................................. 710/131 |

* cited by examiner

*Primary Examiner*—Chau Nguyen
*Assistant Examiner*—Soon-Dong Hyun
(74) *Attorney, Agent, or Firm*—Foley & Lardner (57) ABSTRACT

A method of internal data communication for a packet-switching computer includes the step of configuring internal components of the computer and an internal packet switch bank to communicate using a fixed size local data packet. The local data packet has a fixed size header portion and a fixed size data portion. The local data packet may be directly compatible with an ATM cell. Alternatively, only the data portion size of the local data packet may correspond to the size of the ATM cell data payload or an integer multiple thereof. In order to increase data throughput, the size of the header portion of the local data packet may be less than size of the ATM cell header.

7 Claims, 9 Drawing Sheets

FIG. 1

PRIOR ART

FIG. 2

PRIOR ART

METHOD OF COMMUNICATION FOR A COMPUTER USING PACKET SWITCHES FOR INTERNAL DATA TRANSFER

RELATED APPLICATIONS

This application is related to an application entitled "COMPUTER ARCHITECTURE USING PACKET SWITCHES FOR INTERNAL DATA TRANSFER," Ser. No. 08/915,631, now U.S. Pat. No. 6,035,366 which is filed concurrently with this application and which is incorporated by reference herein.

This application is also related to provisional application 60/039,423, filed Mar. 7, 1997, to which this application is entitled to that priority date.

BACKGROUND OF THE INVENTION

1. Field of the Invention

The invention relates to a method of internal and external data transfer and, in particular, to a method of communication for a computer using packet switches for internal data transfer.

2. Related Art

In a conventional computer architecture, data is transferred between internal computer components via a data bus. This method of data transfer has many problems, as described in the above-referenced related application, including bus contention, limited bandwidth, and mismatch between the clock speed of the bus and the native speeds of the internal computer components.

Another problem with the conventional computer architecture is external communication. Typically, such communication requires a complicated translation between the external communication protocol and the internal data transfer method.

SUMMARY OF THE INVENTION

It is an object of the invention to provide a method of internal data transfer which overcomes the above and other problems. In particular, it is an object of the invention to provide a method of communication for a packet-switching computer. As used herein, the term "packet-switching computer" refers to a computer which uses packet switches for internal data transfer.

It is also an object of the invention to provide a simplified method of external communication. In particular, it is an object of the invention to provide a method of communication between a packet-switching computer and an external network which requires little or no translation of data.

The above and other objects of the invention are accomplished by a method of a first embodiment according to the invention which includes the step of configuring a plurality of components of a packet-switching computer and an internal packet switch bank of the packetswitching computer to communicate using a predetermined size local data packet. The predetermined size local data packet includes a predetermined size header portion and a predetermined size data portion.

The predetermined size local data packet may be an ATM cell. Alternatively, a predetermined size of the predetermined size data portion may correspond to a predetermined size of a data payload portion of an ATM cell or an integer multiple of a predetermined size of a data payload portion of an ATM cell.

In order to improve a header size-to-cell size ratio, a predetermined size of the predetermined size header portion may be less than a predetermined size of a header portion of an ATM cell. For example, the predetermined size of the predetermined size header portion may be one byte.

In a second embodiment according to the invention, complete compatibility between a packet-switching computer and an asynchronous transfer mode (ATM) network is achieved by a method of communication which includes the first step of configuring the packet-switching computer's internal components and an internal packet switch bank to communicate using a packet corresponding to an ATM cell. The second step involves providing a network interface to communicate with said ATM network. The network interface is coupled to the packet switch bank. In the third step, an ATM cell is received into the network interface. Next, the ATM cell is transferred from the network interface to the packet switch bank.

In a third embodiment according to the invention, a method of communication between a network and a packet-switching computer includes the first step of receiving a network packet from the network into a network interface. In the second step a local packet is produced at the network interface. The local packet includes a data portion of the network packet and a local header portion. The third step includes communicating the local packet from the network interface to an internal packet switch bank. Either or both the network packet and the local packet may be an ATM cell.

A fourth embodiment according to the invention is similar to the third embodiment, except the second step of the fourth embodiment may include, first, removing a header portion of the network packet, and, second, adding the local header portion to the data portion of said network packet to produce the local packet. In this alternative, the local packet may not correspond exactly to an ATM cell, but may be of a predetermined size and include a predetermined size header portion and a predetermined size data payload portion. In this situation, a predetermined size of the predetermined size data payload portion may correspond to a predetermined size of a data payload portion of an ATM cell. In order to improve header size-to-cell size ratio, a predetermined size of the predetermined size header portion may be less than a predetermined size of a header portion of an ATM cell.

In a fifth embodiment according to the invention, a method of communication between a network and a packet-switching computer includes the first step of receiving multiple network packets from the network into a network interface. In the second step, a local packet is produced at the network interface. The local packet includes data portions from each of the network packets and a local header portion. In the third step, the local packet is transferred to an internal packet switch bank.

In the fifth embodiment according to the invention, the second step may include, first, removing a header portion from each of the network packets, second, assembling a local data portion from data portions from each of the network packets, and, third, adding the local header portion to the local data portion to produce the local packet.

BRIEF DESCRIPTION OF THE DRAWINGS

These and other objects and advantages of the invention will be apparent from a review of the specification in light of the drawings, wherein.

DETAILED DESCRIPTION OF THE PREFERRED EMBODIMENTS

Figure 1:
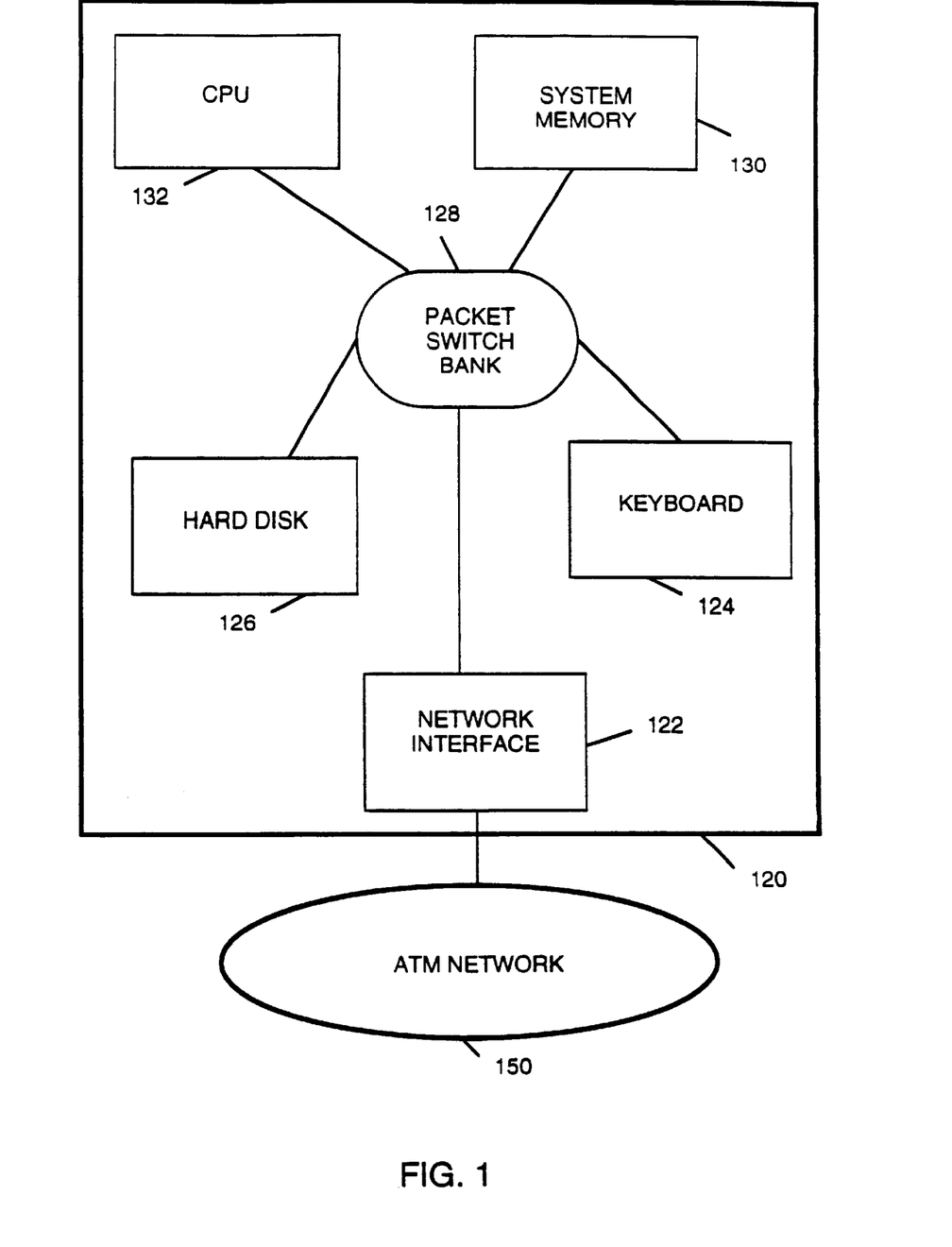
FIG. 1 shows a block diagram of a computer which uses packet switches for internal data transfer.

FIG. 1 shows a block diagram of a packet switching computer 120 with a computer architecture similar to the various embodiments of the invention disclosed in the related U.S. application Ser. No. 08/915,631 entitled "COMPUTER ARCHITECTURE USING PACKET SWITCHES FOR INTERNAL DATA TRANSFER." Packet switch bank 128 interconnects computer components such as central processing. unit (CPU) 132, system memory 130, hard disk 126 and keyboard 124. Packet switch bank 128 is also connected to network interface 122 which is in communication with an external ATM network 150.

ATM is a high-bandwidth communication protocol which supports the transmission of information in short, fixed-length cells (ATM Cells). ATM is designed to integrate the transmission of multiple data services on a single network. Such data services might range from low-bandwidth services, such as voice data, to high-bandwidth services, such as high definition television (HDTV). Details of ATM can be found in BROADBAND: Business Services, Technologies, and Strategic Impact, written by David Wright, published by Artech House, 1993.

Figure 2:
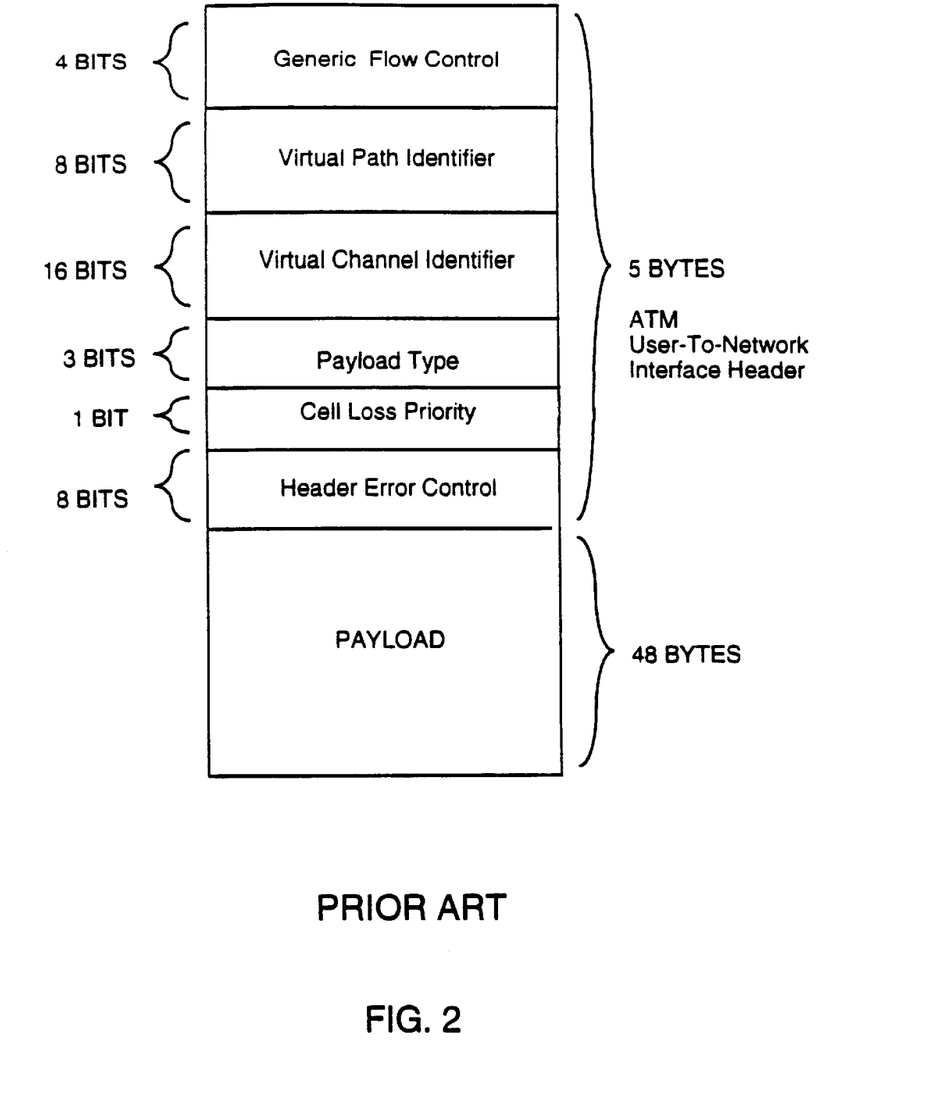
FIG. 2 shows a conventional structure of an ATM cell with a User-To-Network Interface Header.
Figure 3:
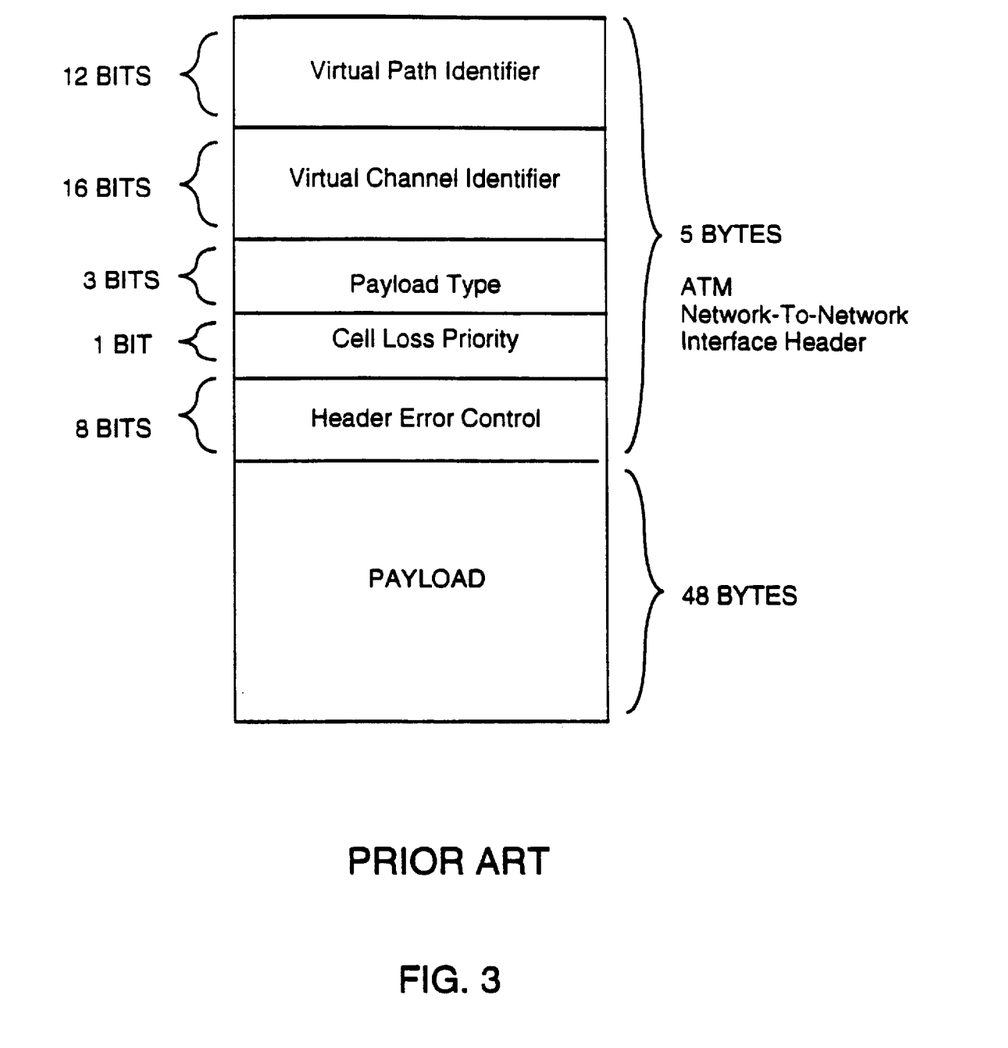
FIG. 3 shows a conventional structure of an ATM cell with a Network-To-Network Interface Header.

FIG. 2 shows a standard ATM Cell structure for an ATM Cell with a User-To-Network Interface Header. This ATM Cell structure would be used for interfaces between an ATM network and a user. FIG. 3 shows a standard ATM Cell structure for an ATM Cell with a Network-To-Network Interface Header. This ATM Cell structure would be used for interfaces between an two ATM networks. The various subportions of the headers are described in detail in the above-referenced book written by David Wright.

For both ATM Cell structures, a header portion of the ATM Cell is fixed at 5 bytes and a data portion of the ATM Cell, also referred to as a "data payload," is fixed at 48 bytes. Thus, the total size of an ATM Cell is fixed at 53 bytes.

Figure 4:
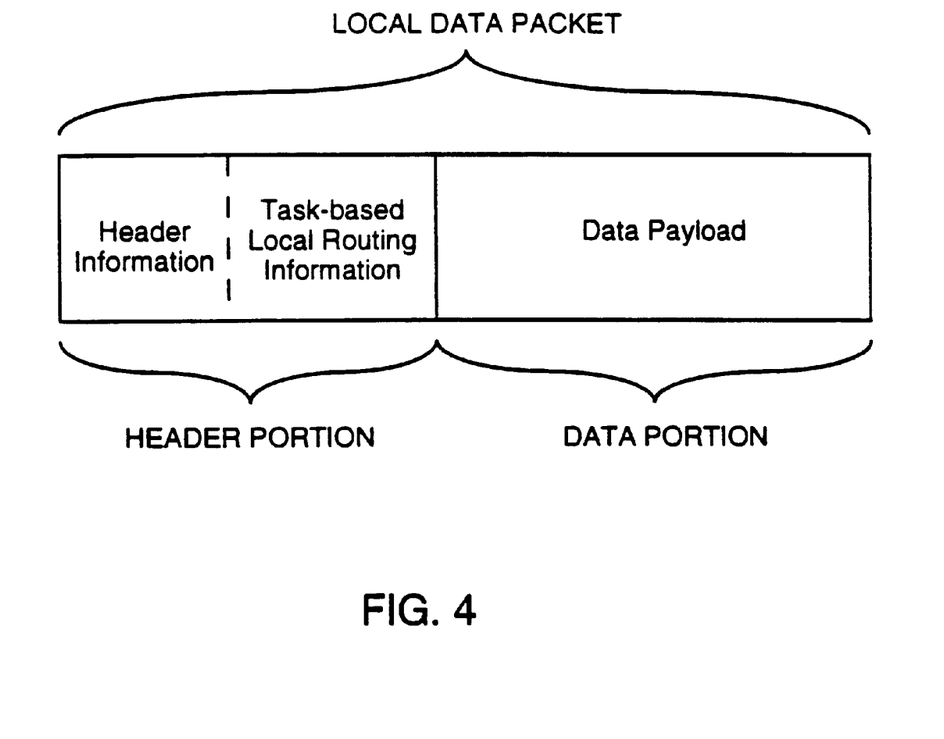
FIG. 4 shows a structure of a local data packet according to the invention.

FIG. 4 shows a local data packet according to the invention. The local data packet has a header portion and a data portion. Both the header portion and the data portion have respective predetermined sizes. The header portion of the local data packet includes header information and task-based local routing information. By utilizing predetermined sizes for the header and data portion, the local data packet according to the invention simplifies the design of interfaces which operate on the local data packet, such as the packet switch bank 128 of FIG. 1.

First Embodiment

Figure 5:
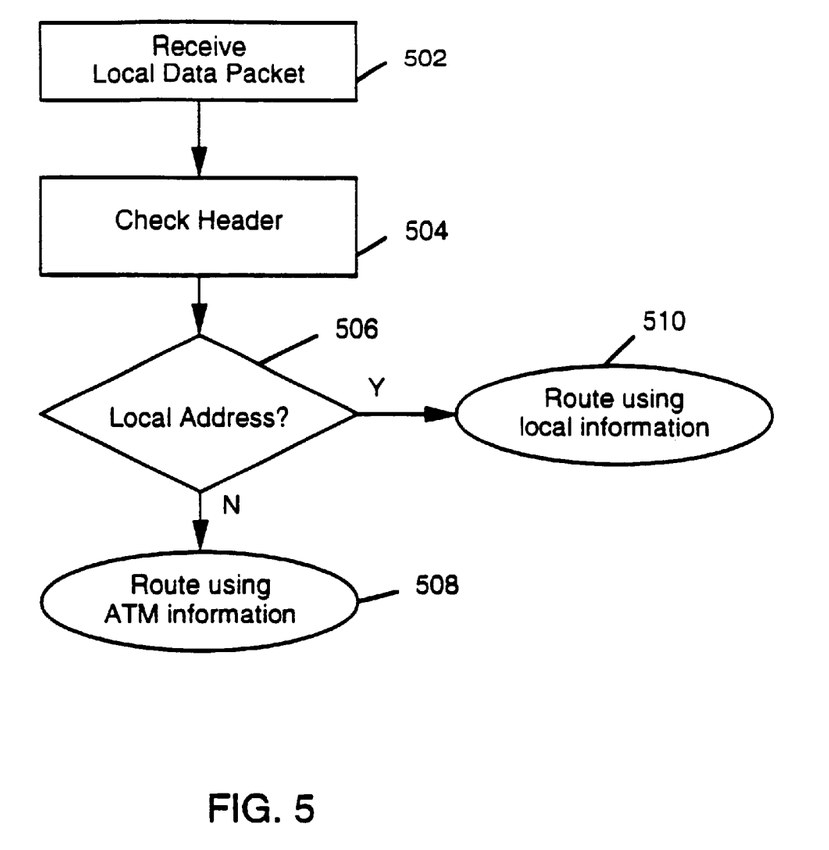
FIG. 5 shows a flow diagram of a method of communication of a first embodiment according to the invention for internal data transfer.

FIG. 5 shows a flow diagram of a method of communication of a first embodiment according to the invention for internal data transfer. In processing step 502, a local data packet is received. The local data packet may correspond to a local data packet as described with reference to FIG. 4. Next, in processing step 504, a header portion of the local data packet is examined. In decision step 506, if the header information indicates that routing should be performed using a local address, the local data packet is routed using the local information in processing step 510. However, if the header information indicates that the local data packet is a non-local ATM cell, the local data packet is routed using the ATM cell information in processing step 508.

The flow diagram shown in FIG. 5 is useful for internal data communication for a packet-switching computer such as the one shown in FIG. 1. For example, the various components and interfaces could be configured to communicate using a predetermined size local data packet. Such configuration would be relatively simple because of the known and fixed data sizes. Routing of local data packets could then be performed in accordance with the flow diagram shown in FIG. 5.

Second Embodiment

A particularly advantageous example for external data communication would have the local data packet corresponding exactly to an ATM cell. A packet-switching computer thus configured would be directly ATM compatible.

Figure 6:
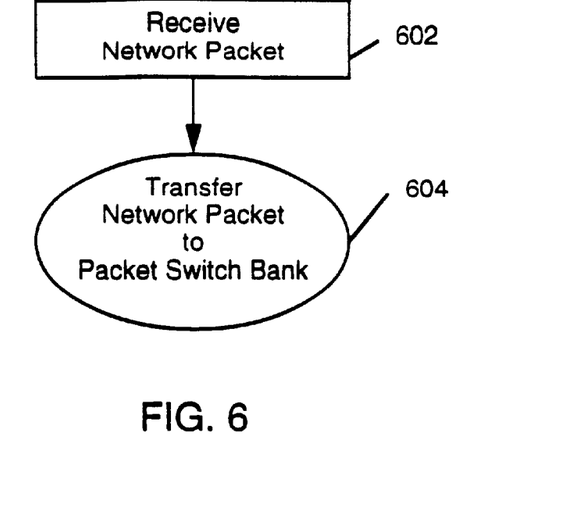
FIG. 6 shows a flow diagram of a method of communication of a second embodiment according to the invention for external communication.

FIG. 6 shows a flow diagram of a method of communication of a second embodiment according to the invention for external communication. In processing step 602, a network packet is received. Next, in processing step 604, the network packet is transferred to a packet switch bank for local routing.

The flow diagram shown in FIG. 6 would be useful for a packet-switching computer, such as the one shown in FIG. 1, which could be configured to be directly ATM compatible. No translation or processing of the network packet would be required for internal data communication.

Third Embodiment

In many situations, however, local data may be transferred using a header size smaller than the 5-byte ATM cell header size. An ATM cell has a header size-to-cell size ratio of 5/53 corresponding to an overhead of approximately ten percent (10%). In order to improve the header size-to-cell size ratio of the local data packet, the size of the local header portion may be less than that of the ATM cell. For example, local routing information may only require one byte. If the local data packet size remains fixed at 53 bytes, the header size-to-cell size ratio is 1/53 corresponding to an overhead of approximately two percent (2%). For entirely local data transfers, data throughput is increased by reducing the header size-to-cell size ratio because 52 bytes can be designated as a data portion of the local data packet.

Figure 7:
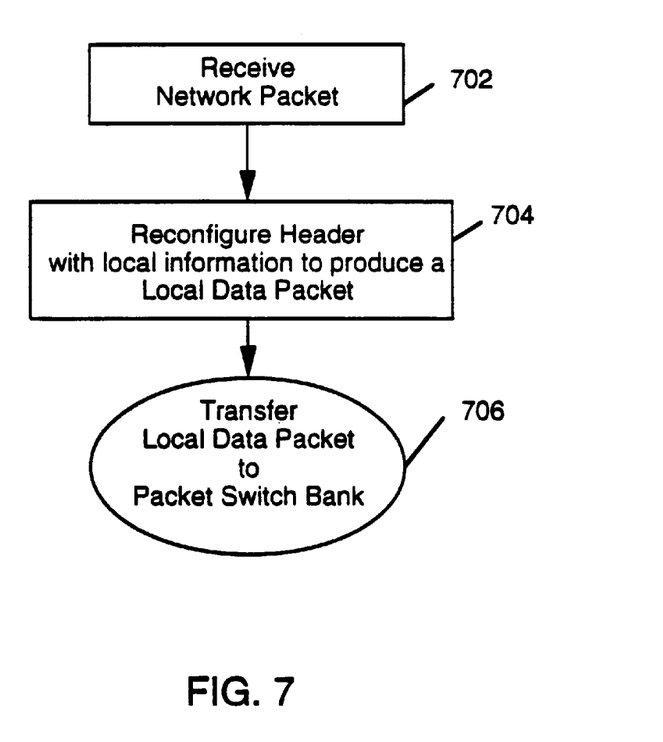
FIG. 7 shows a flow diagram of a method of communication of a third embodiment according to the invention for external communication.

FIG. 7 shows a flow diagram of a method of communication of a third embodiment according to the invention for external communication wherein local data transfer is accomplished using a local data packet size corresponding to the cell size of a network packet, but with a smaller header portion to improve throughput for entirely local data transfers.

In processing step 702, a network packet is received, for example, by a network interface 122 as shown in FIG. 1.

Next, in processing step 704, the header portion of the network packet is reconfigured with local information to produce a local data packet. In processing step 706, the local data packet is transferred to a packet switch bank for further local routing.

The third embodiment according to the invention provides an advantage of simplifying the various data transfer interfaces by utilizing a predetermined packet size which is compatible with a corresponding network packet, such as an ATM cell. A further advantage is provided by utilizing a smaller header portion for entirely local data transfers, thereby increasing data throughput.

Fourth Embodiment

Similar advantages to those described with respect to the third embodiment may be provided by an alternate arrangement. In the fourth embodiment according to the invention, the data portion of the local data packet corresponds to the fixed data portion of a network packet, such as the 48-byte data payload of an ATM cell. However, in order to improve the header size-to-cell size ratio, internal data transfer is performed using a fixed header size which is smaller than the network packet header size. For example, if local routing requires only a one byte header, the local data packet would have a cell size of 49 bytes with a header size-to-cell size ratio of 1/49 corresponding to an overhead of approximately two percent (2%).

Figure 8:
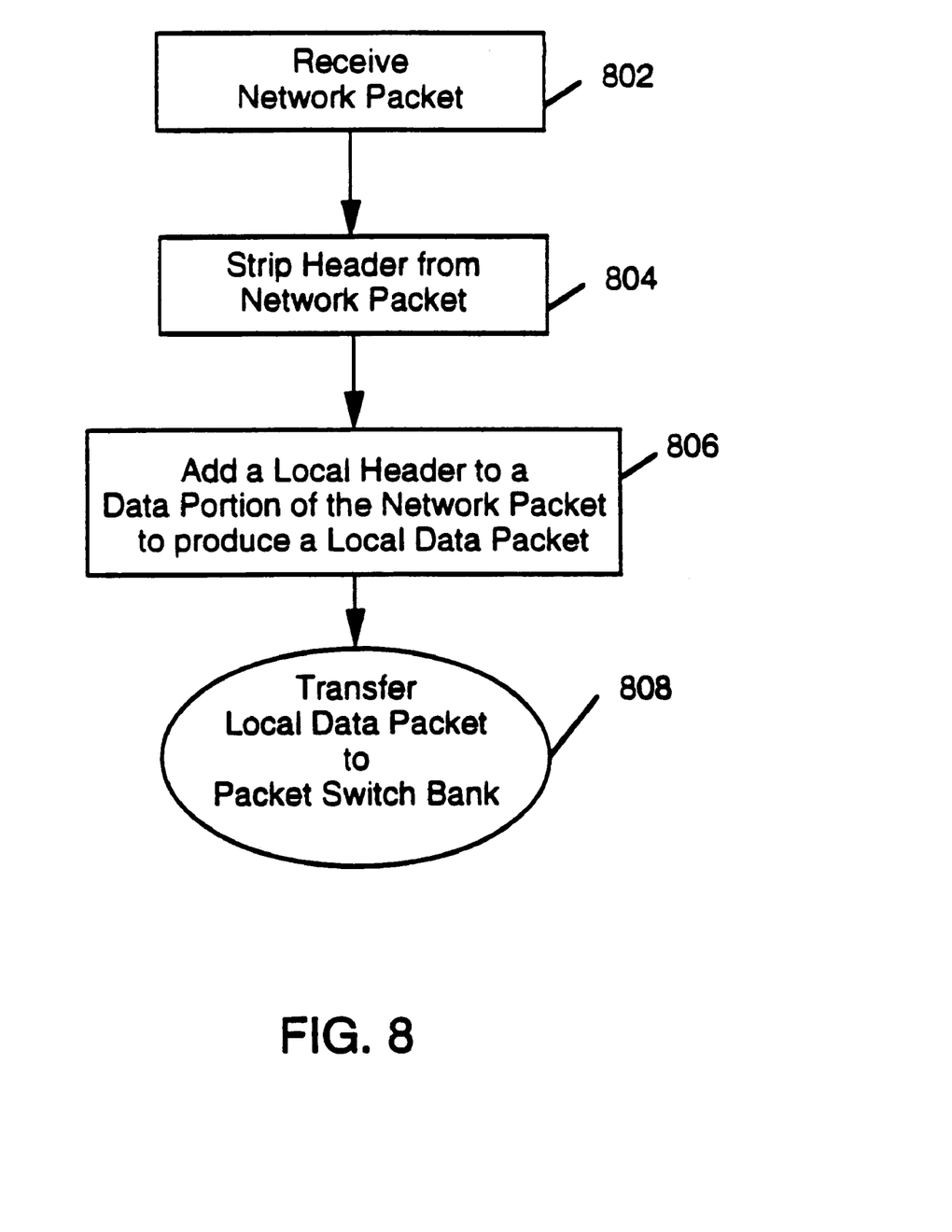
FIG. 8 shows a flow diagram of a method of communication of a fourth embodiment according to the invention for external communication.

FIG. 8 shows a flow diagram of a method of communication of a fourth embodiment according to the invention for external communication. In processing step 802, a network packet is received. Next, in processing step 804, a header portion of the network packet is stripped from the network packet, thereby leaving only a data portion of the network packet. In processing step 806, a local header is added to the data portion of the network packet to produce a local data packet. And, in processing step 808, the local data packet is transferred to the packet switch for further local routing.

one skilled in the art will appreciate that, according to the invention, a similar process is performed in reverse order for transferring local data to an external network. In other words, a local data packet would be transferred from the local switch bank to a network interface, the local header portion would be stripped and a network header would be added to the remaining data portion to produce a network packet, and the network packet would be transmitted to the external network.

Fifth Embodiment

Figure 9:
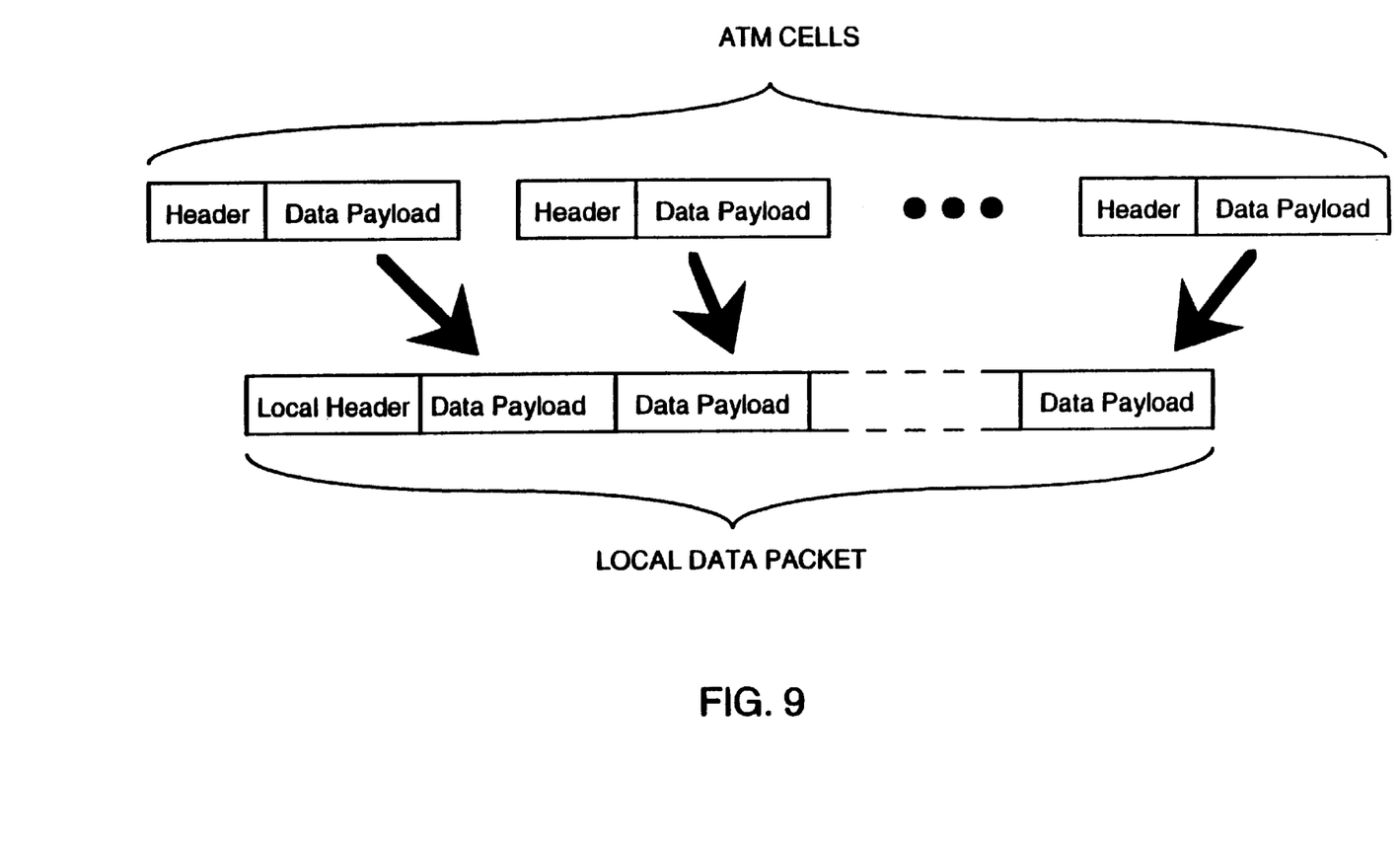
FIG. 9 shows an alternative structure of a local data packet according to the invention.

FIG. 9 shows an alternative structure of a local data packet according to the invention. The local data packet has a header portion and multiple data portions. The local header portion has a predetermined size. Each data portion has a predetermined size corresponding to a predetermined size of a data portion of a network packet. For example, the data portion may have a fixed size of 48 bytes corresponding to the fixed size of the data payload of an ATM cell. The overall size of the data portion of the local data packet is therefore an integer -multiple of the predetermined size of the data portion of the corresponding network packet.

Figure 10:
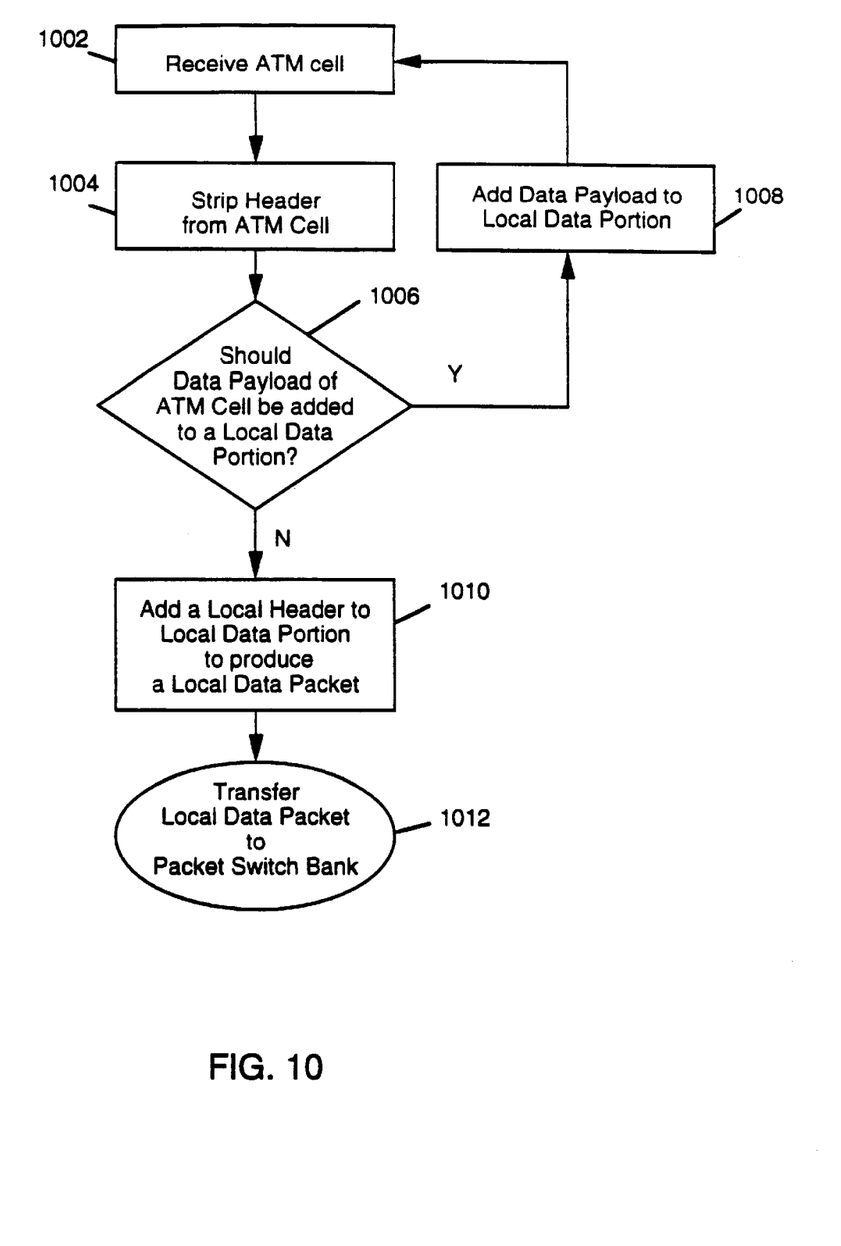
FIG. 10 shows a flow diagram of a method of communication of a fifth embodiment according to the invention for external communication.

FIG. 10 shows a flow diagram of a method of communication of a fifth embodiment according to the invention for external communication which utilizes the local data packet disclosed in FIG. 9 with the size of the data portions corresponding to a data payload of an ATM cell. In processing step 1002, an ATM cell is received. In processing step 1004, the header is stripped from the ATM cell. Next, in decision step 1006, a decision is made as to whether or not the data payload should be added to a local data portion. If decision step 1006 determines that the data payload should be added to the local data portion, processing step 1008 does so. Otherwise, in processing step 1010, a local header is added to the local data portion to produce a local data packet and, in processing step 1012, the local data packet is transferred to a packet switch bank.

The fifth embodiment according to the invention provides advantages in data throughput and simplification of design. Greater data throughput can be achieved because the header size-to-cell size ratio can be greatly reduced. For example, if the size of the data portion is a multiple of 10 with respect to the size of the data payload of an ATM cell, and assuming that local routing requires only a 1 byte header, the header size-to-cell size ratio is 1/481 corresponding to an overhead of approximately two-tenths of one percent (0.2%). Moreover, because the local data packet size is fixed, the design of the local data interfaces is relatively simple, and, because the local data portion size is an integer multiple of the ATM cell data payload size, the design of the network data interface is also relatively simple.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A method of communication between a network and a computer which includes a plurality of components, a network interface, and an internal packet switch bank for communicating therebetween, said method comprising the steps of:
   (a) receiving a network packet from the network into said network interface;
   (b) producing a local packet at said network interface, said local packet including a data portion of said network packet and a local header portion; and
   (c) communicating said local packet from said network interface to said internal packet switch bank,
   wherein said local packet is of a predetermined size and includes a predetermined size header portion and a predetermined size data payload portion, wherein a predetermined size of said predetermined size data payload portion corresponds to a predetermined size of a data payload portion of an ATM cell, and
   wherein a predetermined size of said predetermined size header portion is less than a predetermined size of a header portion of an ATM cell.

2. The method of communication as recited in claim 1, further comprising the step of, between steps (a) and (b):
   (a1) stripping off a header portion from said network packet and determining whether or not said network packet is addressed to one of said plurality of components,
   wherein, said local packet does not include said header portion of said network packet.

3. A method of communication between a network and a computer which includes a plurality of components, a network interface, and an internal packet switch bank for communicating therebetween, said method comprising the steps of:
   (a) receiving a plurality of network packets from the network into said network interface, each of said network packets including a header portion and a data portion;

(b) stripping off said header portion of each of said network packets to determine whether any of said network packets are destined to any of said plurality of components;

(c) if any of said network packets are destined to any of said plurality of components, producing a local packet at said network interface, said local packet including a local header portion and data portions from each of said plurality of network packets that are determined to be destined to any of said plurality of components, said data portions being contiguously positioned in a back-to-back manner within said local packet and said local header portion being positioned at a beginning portion of said local packet; and (d) communicating said local packet from said network interface to said internal packet switch bank, wherein said local header portion does not include said header portion of said network packets that was stripped off in step (b).

4. The method of communication as recited in claim 3, wherein step (b) comprises the steps of:

(1) removing a header portion from each of said plurality of network packets;

(2) assembling a local data portion from said data portions from each of said plurality of network packets; and (3) adding said local header portion to said local data portion to produce said local packet.

5. The method of communication as recited in claim 3, wherein said network packet is an ATM cell.

6. The method of communication as recited in claim 3, wherein said local packet is of a predetermined size and includes a predetermined size header portion and a predetermined size data payload portion, wherein a predetermined size of said predetermined size data payload portion corresponds to an integer multiple of a predetermined size of a data payload portion of an ATM cell.

7. A method of communication between a network and a computer which includes a plurality of components, a network interface, and an internal packet switch bank for communicating therebetween, said method comprising the steps of:

(a) receiving a plurality of network packets from the network into said network interface;

(b) producing a local packet at said network interface, said local packet including data portions from each of said plurality of network packets and a local header portion; and (c) communicating said local packet from said network interface to said internal packet switch bank, wherein said local packet is of a predetermined size and includes a predetermined size header portion and a predetermined size data payload portion, wherein a predetermined size of said predetermined size data payload portion corresponds to an integer multiple of a predetermined size of a data payload portion of an ATM cell, and wherein a predetermined size of said predetermined size header portion is less than a predetermined size of a header portion of an ATM cell.

* * * * *